June 27, 1972   W. C. KINSINGER   3,672,756
FILM VIEWER
Filed Dec. 11, 1969                                    3 Sheets-Sheet 1
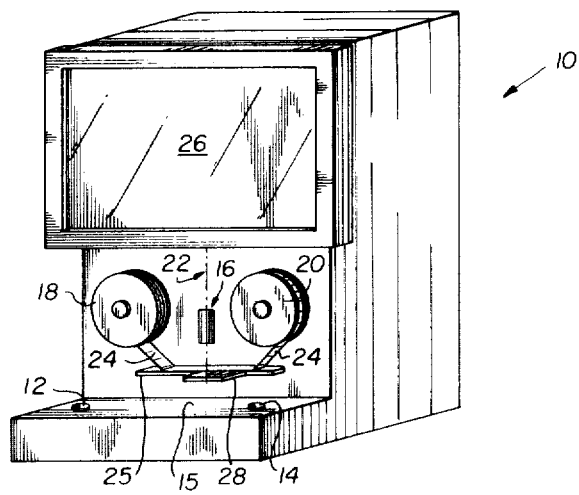
*FIG.1*
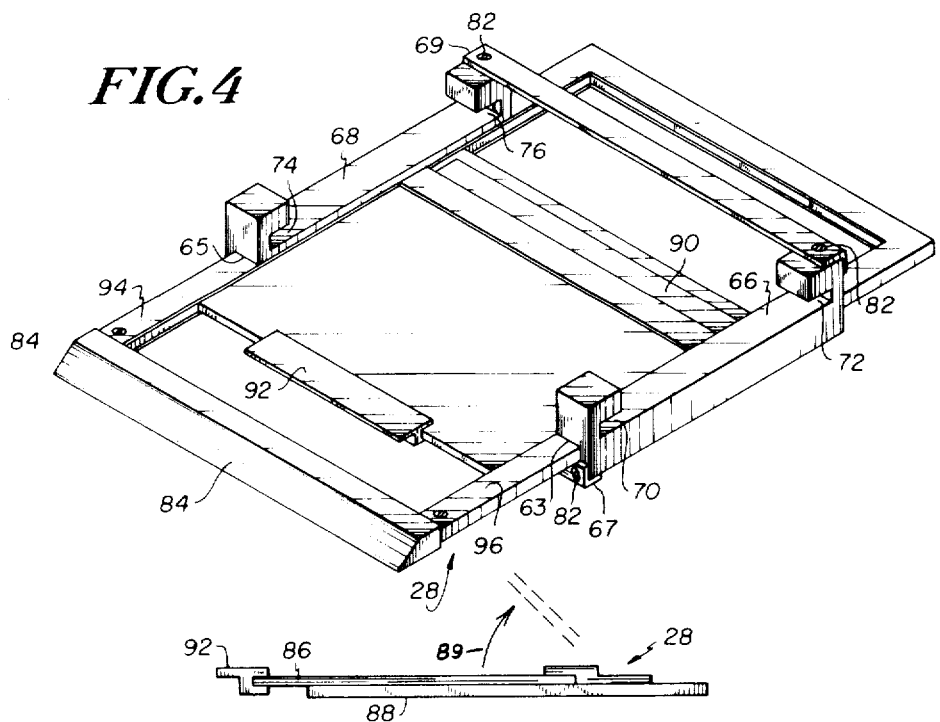
*FIG.4*
*FIG.5*
INVENTOR.
WILLIAM CHARLES KINSINGER
BY
LERNER, DAVID & LITTENBERG
ATTORNEYS June 27, 1972  W. C. KINSINGER  3,672,756

FILM VIEWER

Filed Dec. 11, 1969  3 Sheets-Sheet 2

INVENTOR.
WILLIAM CHARLES KINSINGER
BY
LERNER, DAVID & LITTENBERG
ATTORNEYS

June 27, 1972   W. C. KINSINGER   3,672,756
FILM VIEWER

Filed Dec. 11, 1969   3 Sheets-Sheet 3

INVENTOR.
WILLIAM CHARLES KINSINGER
BY
LERNER, DAVID & LITTENBERG
ATTORNEYS

United States Patent Office 3,672,756
Patented June 27, 1972

3,672,756
FILM VIEWER
William Charles Kinsinger, New York, N.Y., assignor to Metagraphic Systems, Inc., Bronx, N.Y.
Filed Dec. 11, 1969, Ser. No. 884,260
Int. Cl. G03b 21/11
U.S. Cl. 353—68
11 Claims

ABSTRACT OF THE DISCLOSURE

Apparatus for holding and guiding film in either roll or plate form for viewing of either type of film through a lens, comprising means for sequentially guiding portions of film in roll form into a first viewing position of the lens disposed in a first plane, means for disposing film in plate form in a second plane parallel to the first plane, the second plane containing a second viewing position of the lens, means for moving the film in plate form within the second plane to position a desired portion thereof within the second viewing position, and means mounting the lens for movement relative to the viewing positions for focusing on film in either viewing position. A microfilm reader utilizing the aforesaid apparatus is provided which is capable of reading microfilm in roll form or in plate form.

BACKGROUND OF THE INVENTION

This invention relates to film viewers, and particularly to microfilm readers.

Microfilm is available in a number of film formats which are widely used as a means for storing large quantities of information in relatively small storage areas. Some of the more popular formats include microfilm in roll form, in fiche form, and in card form. Microfilm in roll form comprises a continuous strip of film rolled on a reel and containing sequentially spaced film images or frames. Microfilm in card form comprises film including one or more images thereon mounted on a card for ease of handling and storage. Microfilm in fiche form, commonly referred to as microfiche, generally comprises a rectangular sheet of film containing a plurality of film images arranged in rows and columns.

Microfilm in roll form is useful for storing large amounts of information. Microfiche and cards carrying microfilm are useful for storing smaller amounts of information. Depending on one's needs, microfilm in one of the forms may be preferred. However, there are many instances where more than one form is desirable. For example, microfiche may be used as a means of updating information on rolls of microfilm. In such instances, separate microfilm and microfiche viewers are now needed.

When converting to the use of microfilm for information storage, or initially setting up a microfilm storage system, a decision must be made as to which film format is preferable. On the basis of this decision, a large portion of the initial investment goes to the purchase of the microfilm viewers, known generally as microfilm readers. If it turns out that the selected film format is not suitable, one is faced with the problem of either continuing with the initially selected format or making another large investment in readers for viewing the new format. Such investment would also be necessary if it is desired to utilize both film in roll and fiche form.

SUMMARY OF THE INVENTION

This invention provides apparatus for holding and guiding film in either roll or plate form for viewing of either type of film through a lens. The film in roll form may be microfilm and the film in plate form may be microfiche and/or microfilm carrying cards. This invention particularly provides a combined microfilm and microfiche (and card) reader of reliable and relatively simple construction.

The provision of a combined microfiche and microfilm viewer permits the use of a single viewer for all film formats. Further, it reduces the consequences of an initially poor decision as to the desired film format.

The apparatus for holding and guiding film in either roll or plate form for viewing of either type of film through a lens includes means for sequentially guiding portions of film in roll form into a first viewing position of the lens, the first viewing position being disposed in a first plane, means for disposing film in plate form in a second plane parallel to the first plane, the second plane containing a second viewing position of the lens, means mounting the lens for movement relative to the viewing positions for focusing on film in either viewing position, and means for moving the film in plate form within the second plane to position a desired portion thereof within the second viewing position.

The apparatus may be for holding and guiding film in roll or plate form for viewing of rectangular areas of either type of film through a lens, the rectangular areas being disposed in sequence on the film in roll form and in columns and rows on the film in plate form. Such apparatus would comprise roll film guiding means for sequentially guiding rectangular areas of film in roll form into the, for example, first viewing position of the lens, a, for example, holder for receiving and holding film in plate form, means for mounting the holder so that film held by the holder is disposed in the second plane, first moving means for moving the holder forwards and backwards within the second plane in a first direction, and second moving means for moving the holder forwards and backwards within the second plane in a direction perpendicular to the first direction, whereby selected rectangular areas of the film in plate form may be disposed in the second viewing position.

This invention further provides a microfilm reader for viewing microfilm in roll or fiche form, including an objective lens, a light source directed toward the objective lens, a screen, means for displaying film images passing through the objective lens on the screen, means for sequentially passing portions of film in roll form into a first viewing position of the objective lens disposed in a first plane which is disposed between the objective lens and the light source and is normal to a center line passing through the axis of the objective lens, means for disposing film in plate form in a second plane disposed between the objective lens and the light source in parallel to said first plane, said second plane containing a second viewing position of the objective lens, means mounting the objective lens for movement normal to the planes, and means for moving the film in plate form in at least two directions within the second plane to position a desired film image thereon within the second viewing position.

BRIEF DESCRIPTION OF THE DRAWINGS

FIG. 1 is a perspective view of a microfilm viewer in accordance with the present invention;

FIG. 4 is a perspective view of the plate film holder and means for mounting of the holder; and FIG. 5 is a side elevational view of the plate film holder.

DESCRIPTION OF THE PREFERRED EMBODIMENT

Figure 2:
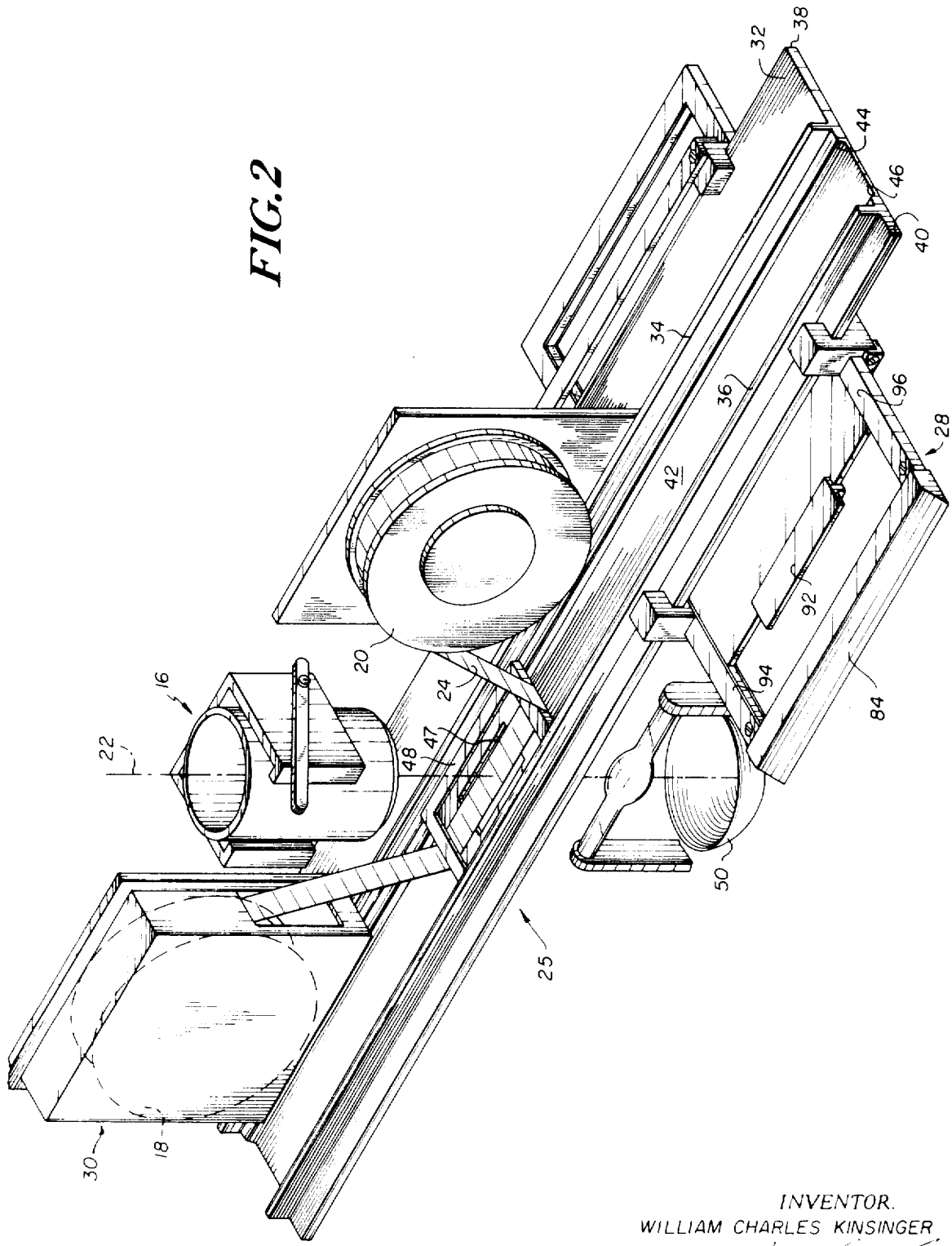
FIG. 2 is a perspective view of apparatus for holding and guiding film in roll or plate form for viewing of the film through a lens with the lens and plate film holder in position for viewing of roll film.

FIG. 1 is a perspective view of a microfilm reader 10 in accordance with the present invention. The reader 10 has an objective lens position control knob 12 and a roll film feed rate control knob 14 positioned on a control panel 15. The objective lens 16 is disposed between the reel 18 for roll film delivery and the reel 20 for roll film take-up. The objective lens 16 is part of an image display system for displaying images passing through the objective lens 16 on the screen 26.

The roll film 24 is fed, during forward feeding, from spool 18 into the elongated film guide member 25 and therein past a viewing position of the objective lens 16 disposed centrally of a center line passing through the central longitudinal axis of the objective lens 16 as indicated by the dot-dash line 22. From here, the film is guided to the take-up spool 20.

It is apparent from the above that the microfilm reader 10 as illustrated in FIG. 1 is being utilized to view roll film 24. If it is desired to view film in plate form, the roll film 24 is wound onto the reel 18 and the film in plate form (not shown in FIG. 1) is placed in a plate film holder 28. The plate film holder 28, as is fully explained hereinafter, is then moved into a position in which the film in plate form is disposed in another viewing position of the objective lens 16 disposed centrally of the center line 22 and below the first viewing position of the objective lens 16.

The apparatus utilized in the reader 10 for holding and guiding film in roll or plate form for viewing of film images on the film through the objective lens 16 is shown in a perspective view in FIG. 2 to which reference will now be made. In FIG. 2, the roll film 24 is shown as part of a film cartridge 30. The reel 18 is an integral part of the film cartridge 30.

The elongated film guide member 25 comprises a flat strip 32 having parallel upstanding elongated guide members 34 and 36. The guide members 34 and 36 are disposed in parallel with the elongated edges 38 and 40 of the strip 32 and are perpendicular to the plane of the strip 32. The guide members 34 and 36 are spaced a predetermined distance apart. A film guide channel 42 is disposed centrally of the guide members 34 and 36 and is defined by a depression formed in the strip 32. The sides 44 and 46 of the film guide channel 42 are also spaced a predetermined distance apart.

Many present microfilm cartridges utilize microfilm in roll form with a lead portion, or leader, (not shown) which is wider than the film itself. The predetermined spacing of the guide members 34 and 36 is such that they accommodate and guide the leading end of the cartridge film. The sides 44 and 46 of the film guide channel 42 are spaced apart a distance permitting the roll film itself to be received therein and guided along a desired path past a viewing aperture 47 cut through the strip 32 and under a platen guide member 48. Further guiding means may also be provided for permitting self-feeding of the roll film 24 but since such means are well known and do not form a part of this invention, they have not been shown.

The image display system of the microfilm reader 10 for displaying images passing through the objective lens 16 on the screen 26 includes, in addition to the objective lens 16, a light source 50 directed towards the objective lens through the viewing aperture 47. Since the construction of the image display system may take many forms, which are well known, and does not form a part of this invention, only the objective lens 16, screen 26 and light source 50 have been shown.

It will be noted in the roll film viewing position of the apparatus shown in FIG. 2 that the plate film holder 28 is positioned out of the path between the light source 50 and the objective lens 16 so as not to obstruct or interfere in any way with the viewing of the roll film 24. This can also be effected by providing for movement of the plate film holder 28 to a position in which the open area defined by the holder sides 94 and 96, the holder handle 84 and the top plate handle 92 is over the aperture 47.

Figure 3:
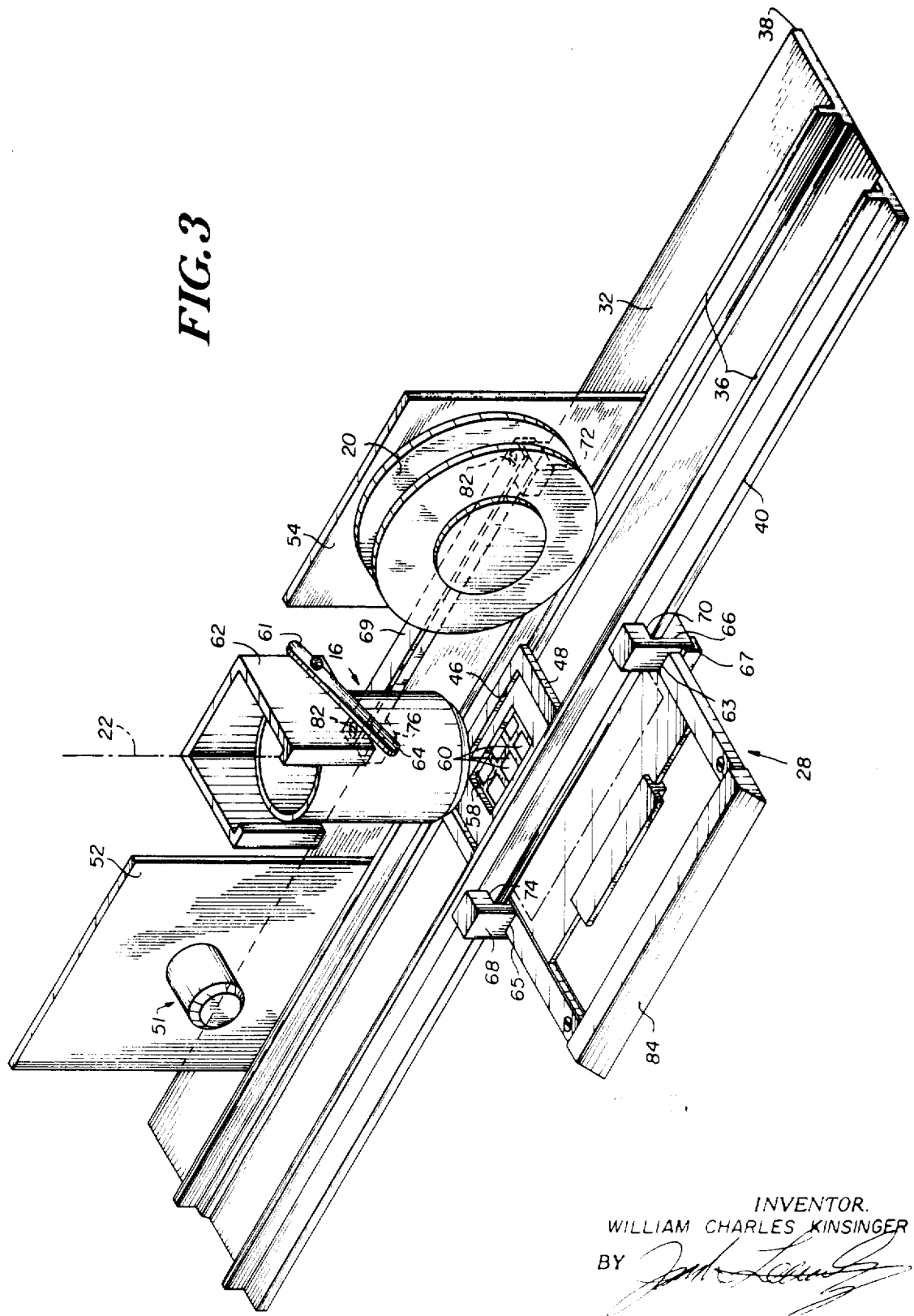
FIG. 3 is another perspective view of the apparatus of FIG. 2 illustrating the plate film viewing position of the plate film holder and of the lens.

FIG. 3 is a further perspective view of the apparatus of FIG. 2 with the film cartridge 30 removed and the plate film holder 28 and objective lens 16 in the plate film viewing position.

With the film cartridge 30 removed, it can be seen that the end of a roll film driveshaft 51 is journaled in a frame member 52 of the reader 10. The driveshaft 51 is adapted to mount the film cartridges 30 and drive the reel 18. The reel 20 is rotatably mounted on a further frame member 54.

To bring the plate film holder 28 into the plate film viewing position, it is slid along the strip 32 to a position where the plate film 58 is disposed between the objective lens 16 and the light source 50 (FIG. 2). The plate film has rectangular film images 60 thereon which can be viewed through the viewing aperture 46.

The viewing position of the plate film is in a plane defined by the plate film and, therefore, in the construction shown, is disposed beneath the strip 32. The viewing position of the roll film is in a plane defined by that portion of the roll film disposed beneath the platen 48 during viewing and is therefore above the plane defined by the bottom of the film guide channel 42. The distance between the two viewing planes is preferably as short as possible. However, it must be of a sufficient length such that the thickness of the strip 32 below the film guide channel 42 will have the necesary mechanical strength. This distance is preferably less than one-quarter of one inch and, in the preferred embodiment, this distance is approximately one-eighth of one inch.

In order to focus the objective lens 16 on the film images 60, it must be moved down from its position for focusing on the roll film 24 shown in FIG. 2 to the position shown in FIG. 3. This is accomplished by turning of the objective lens position control knob 12 which operates a well known linkage (not shown) which terminates in the link 61 connected to the objective lens mounting member 62. If desired, the objective lens position control knob 12 and its associated linkage can be replaced by a single link, such as the link 61, pivoted to the frame of the reader 10 in such a manner that movement of the link by manual movement of its end 64 will effect the desired positioning.

The means in the presently preferred embodiment which provide for sliding movement of the plate film holder 28 in a first direction longitudinally of the strip 32 also provides for movement of the plate film holder 28 in a second direction in the plane of movement of the first direction and perpendicular to said first direction. This means generally comprises the mounting members 66 and 68 which are assembled and held in a fixed relationship by angle members 67 and 69. As will be explained hereinafter, this relatively simple construction provides a most efficient means for providing for the movement of the plate film holder 28 in directions permitting a desired rectangular film image 60 of the plate film 58 to be disposed in the plate film viewing position.

The plate film holder 28 is slidably mounted in channels 63 and 65 of the members 66 and 68 respectively. Anti-friction material may be applied to the portions of the holder 28 engaging the channels 63 and 65 or to the channels themselves. In the preferred embodiment, the members 66 and 68 are made of nylon and thus inherently provide for relatively frictionless sliding movement of the holder 28.

The members 66 and 68 each also comprise opposed cooperating channels 70, 72 and 74, 76 respectively by which the members are slidably mounted on the strip 32 upon the longitudinal edges 38 and 40 for sliding movement longitudinally of the strip 32. The channels 70, 72 and 74, 76 are constructed so that the plate film 58 retained in the holder 28 moves in a plane parallel to and beneath the strip 32. The channels 63 and 65 are so constructed that when the holder 28 is moved along the channels, the plate film 58 will be moved in the plane defined by the longitudinal movement of the plate film in directions perpendicular to such longitudinal movement.

In order to view a desired rectangular film image 60, the holder is moved longitudinally of the strip 32 by physically moving the holder 28 and the assembly comprising the mounting members 66 and 68 and the angle members 67 and 69. This can be done by grasping the holder 28 and sliding the entire assembly or by grasping a mounting member or both of the mounting members and sliding the entire assembly along the strip 32 by means of the cooperating grooves 70, 74 and 72, 76 and longitudinal edges 40 and 38, respectively. When, for example, the column containing the desired film image 60 is disposed in the viewing position of the objective lens 16, the sliding movement is stopped. The holder 28 is then grasped by the handle 84 and slidingly moved toward or away from the strip 32 to position the row containing the desired film image 60 in the viewing position. In FIG. 3, the film image 60 through which the center line 22 passes is in the viewing position for display on the screen 26 of the reader 10. It will be appreciated that mechanized drive means could be provided for moving the mounting members 66 and 68 and the holder 28 thus replacing the manual operations with a, for example, pushbutton control.

FIG. 4 is a perspective view of the assembled mounting members 66 and 68 and plate film holder 28. The spacing of the members 66 and 68 is determined by their connections to the angle members 67 and 69 and is such that the holder 28 will slide easily along the channels 63 and 65 without undue play so that, once a row is selected, the holder will stay in a relatively fixed position relative to the members 66 and 68. The connections are made with fasteners such as, for example, the screws 82. The cooperating opposed channels 70, 72 and 74, 76 are constructed to facilitate sliding movement of the entire assembly longitudinally of the strip 32 without undue play so that, once a column is selected, the holder and mounting members will remain in a relatively fixed position relative to the viewing aperture 46.

FIG. 5 is a side elevational view of the holder 28. It comprises top and bottom plate members 86 and 88 respectively. These are transparent in at least those areas which would be disposed adjacent plate film positioned in the holder 28. The top plate 86 is pivotally joined to the bottom plate 88 by, for example, an adhesive strip 90. To position or remove plate film from the holder, the top 86 is lifted up away from the bottom plate 88 in the direction indicated by the arrow 89 to the position indicated by the parallel dashed lines. To reverse the process, the top 86 is moved back to the position directly overlying the bottom plate 88 shown in FIG. 5.

While the principles of the invention have been described in connection with specific apparatus, it is obvious that many modifications and changes are possible within the spirit and scope of the invention so that it is clear that this description is made only by way of exeample and not as a limitation to the scope of the invention.

What is claimed is:

1. A microfilm reader for viewing microfilm in roll of fiche form, including an objective lens, a light source directed toward said objective lens, a screen, means for displaying film images passing through said objective lens on said screen, film guide means for sequentially passing portions of film in roll form into a first viewing position of the objective lens disposed in a first plane, said first plane being disposed between the objective lens and the light source and normal to a center line passing through the axis of the objective lens, plate film disposing means for disposing film in plate form in a second plane disposed between said objective lens and said light source, said second plane being parallel to said first plane, said second plane containing a second viewing position of said objective lens, means for moving the objective lens normal to the planes, and plate film moving means for locating and mounting said plate film disposing means in said second plane and movably mounted on said film guide means for moving said plate film disposing means in at least two transverse directions within said second plane to position a desired film image thereon within said second viewing position.

2. Apparatus according to claim 1, wherein the first and second planes are spaced less than one-quarter of one inch apart.

3. Apparatus for holding and guiding film in roll or plate form for viewing of rectangular areas of either type of film through a lens, the rectangular areas being disposed in sequence on the film in roll form and in columns and rows on the film in plate form, comprising roll film guiding means for sequentially guiding rectangular areas of film in roll form into a first viewing position of the lens, said first viewing position being disposed in a first plane, a holder for receiving and holding film in plate form, holder mounting means movably mounted on said roll film guiding means for mounting the holder so that film in plate form held by the holder is disposed in a second plane parallel to said first plane, said second plane containing a second viewing position of the lens, means mounting the lens for movement relative to said viewing positions for focusing on film in either viewing position, said holder mounting means including first mounting means mounting the holder for movement forwards and backwards within said second plane in a first direction, and second mounting means mounting the holder for movement forwards and backwards within said second plane in a direction perpendicular to said first direction, whereby any selected rectangular area of the film in plate form may be disposed in the second viewing position.

4. Apparatus according to claim 3, wherein said roll film guiding means comprises an elongated member, and said first mounting means of said holder mounting means comprises means for mounting the holder for movement longitudinally of said elongated member.

5. Apparatus according to claim 4, wherein the elongated member has a pair of longitudinal parallel edge portions, the holder mounting means comprises a pair of mounting members which comprise said first mounting means, and said mounting members slidably cooperate with said edge portions to provide for movement of said holder longitudinally of said elongated member.

6. Apparatus according to claim 5, wherein the mounting members also comprise said second mounting means and cooperate to mount the holder between the mounting members for movement in said second direction.

7. Apparatus according to claim 6, wherein the holder comprises a pair of parallel edge portions, and said second mounting means comprises a pair of opposed parallel recesses one in each said mounting member for slidably receiving said holder edge portions.

8. Apparatus according to claim 7, wherein the first mounting means comprises second parallel recesses in said mounting members displaced from the pair of opposed parallel recesses and disposed perpendicular thereto, said second parallel recesses being adapted to slidably receive said longitudinal parallel edge portions of the elongated member to provide for sliding movement longitudinally of said elongated member.

9. Apparatus according to claim 4, wherein said elongated member comprises a flat rectangular strip of material having a pair of parallel projecting elongated guide members extending from one side, said elongated guide members being spaced apart by a predetermined distance, and said strip further comprises a guide channel disposed centrally of and parallel to said elongated guide members and having a width less than said predetermined distance.

10. Apparatus for holding and guiding film in roll or plate form for viewing of either type of film through a lens, comprising roll film guide means for sequentially guiding portions of film in roll form into a first viewing position of the lens, said first viewing position being disposed in a first plane, plate film disposing means for disposing film in plate form in a second plane parallel to said first plane, said second plane containing a second viewing position of the lens, lens mounting means mounting the lens for movement relative to the viewing positions for focusing on film in either viewing position, and plate moving means for locating and mounting said plate film disposing means in said second plane and for moving the plate film disposing means within said second plane to position a desired portion thereof within said second plane to position a desired portion thereof within said second viewing position; said roll film guide means including an elongated guide strip and a guide member guidingly positioned thereon, said film passing between said guide strip and said guide member; said plate moving means being slidably supported by said elongated guide strip along the length thereof.

11. The apparatus of claim 10 wherein said plate moving means slidably supports said plate film disposing means in a path of travel transverse to the length of said elongated guide strip.

References Cited

UNITED STATES PATENTS

| | | | |
|---|---|---|---|
| 2,553,075 | 5/1951 | Bradford | 353—68 |
| 3,482,911 | 12/1969 | Noble | 353—68 X |
| 2,793,563 | 5/1957 | Koskela | 353—68 X |
| 3,352,201 | 11/1967 | Brownscombe | 353—27 |
| 2,534,561 | 12/1950 | Silver | 353—27 X |

FOREIGN PATENTS

| | | | |
|---|---|---|---|
| 960,737 | 11/1949 | France | 353—26 |

HARRY N. HAROIAN, Primary Examiner